United States Patent
Uemura et al.

(10) Patent No.: US 9,960,702 B2
(45) Date of Patent: May 1, 2018

(54) SWITCH DEVICE, POWER CONVERSION DEVICE, MOTOR DRIVE DEVICE, AIR BLOWER, COMPRESSOR, AIR CONDITIONER, REFRIGERATOR, AND FREEZER

(71) Applicant: Mitsubishi Electric Corporation, Tokyo (JP)

(72) Inventors: Keisuke Uemura, Tokyo (JP); Takuya Shimomugi, Tokyo (JP); Koichi Arisawa, Tokyo (JP); Yosuke Shinomoto, Tokyo (JP); Shigeo Umehara, Tokyo (JP); Shinichiro Ura, Tokyo (JP); Makoto Tanikawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 259 days.

(21) Appl. No.: 15/022,577

(22) PCT Filed: Sep. 25, 2013

(86) PCT No.: PCT/JP2013/075919
§ 371 (c)(1),
(2) Date: Mar. 17, 2016

(87) PCT Pub. No.: WO2015/045035
PCT Pub. Date: Apr. 2, 2015

(65) Prior Publication Data
US 2016/0233783 A1 Aug. 11, 2016

(51) Int. Cl.
*H02M 7/04* (2006.01)
*H02M 1/08* (2006.01)
(Continued)

(52) U.S. Cl.
CPC .............. *H02M 7/04* (2013.01); *H02M 1/08* (2013.01); *H02M 1/32* (2013.01); *H02M 7/44* (2013.01); *H02M 7/5387* (2013.01)

(58) Field of Classification Search
CPC .. H02M 7/125; H02M 7/538466; H02M 3/28; H02M 3/315; H02H 7/1252; H02H 7/1255; H02H 7/1257; H02H 7/127
See application file for complete search history.

(56) References Cited

U.S. PATENT DOCUMENTS

| 5,825,641 A | 10/1998 | Mangtani |
| 2007/0189048 A1 | 8/2007 | Goto |

(Continued)

FOREIGN PATENT DOCUMENTS

| EP | 2 385 619 A2 | 11/2011 |
| JP | 01-133575 A | 5/1989 |

(Continued)

OTHER PUBLICATIONS

Office Action dated Sep. 27, 2017 in corresponding EP patent application No. 13894471.5.
(Continued)

*Primary Examiner* — Adolf Berhane
*Assistant Examiner* — Afework Demisse
(74) *Attorney, Agent, or Firm* — Posz Law Group, PLC

(57) ABSTRACT

A switch device in a power conversion device is located between a power supply and a load, wherein the power conversion device includes a shunt resistance and a switching element and is capable of executing stable control, the switch device includes a switching element that includes a gate terminal, a gate drive circuit that applies a drive voltage $V_{cc}$ to a gate terminal of the switching element, and a control unit that generates a drive signal to the gate drive circuit, wherein a value obtained by subtracting a threshold voltage (Continued)

$V_{th}$ of the switching element from the drive voltage $V_{cc}$ to be applied to the gate terminal of the switching element is greater than a product of a resistance value $R_{sh}+R_{dc}$ from an emitter of the switching element to a negative electrode of the gate drive circuit and a maximum current value $I_{peak}$ that flows through the switching element.

19 Claims, 6 Drawing Sheets

(51) Int. Cl.
*H02M 7/5387* (2007.01)
*H02M 1/32* (2007.01)
*H02M 7/44* (2006.01)

(56) References Cited

U.S. PATENT DOCUMENTS

2011/0133790 A1 6/2011 Nagata et al.
2015/0318850 A1* 11/2015 Hiyama ............... H03K 17/163
  318/400.26

FOREIGN PATENT DOCUMENTS

| | | |
|---|---|---|
| JP | 2006-067747 A | 3/2006 |
| JP | 2006-271048 A | 10/2006 |
| JP | 2011-120418 A | 6/2011 |
| JP | 2011-135731 A | 7/2011 |
| JP | 2011-196723 A | 10/2011 |
| JP | 2011-239515 A | 11/2011 |
| JP | 2012-114587 A | 6/2012 |
| WO | 2012/169041 A1 | 12/2012 |

OTHER PUBLICATIONS

Extended European Search Report dated Feb. 23, 2017 issued in corresponding EP patent application No. 13894471.5.
International Search Report of the International Searching Authority dated Nov. 12, 2013 for the corresponding international application No. PCT/JP2013/075919 (and English translation).
Office Action dated Dec. 13, 2016 in the corresponding JP application No. 2015-538684 (and partial English translation).

* cited by examiner

SWITCH DEVICE, POWER CONVERSION DEVICE, MOTOR DRIVE DEVICE, AIR BLOWER, COMPRESSOR, AIR CONDITIONER, REFRIGERATOR, AND FREEZER

CROSS REFERENCE TO RELATED APPLICATION

This application is a U.S. national stage application of International Patent Application No. PCT/JP2013/075919 filed on Sep. 25, 2013, the disclosure of which is incorporated herein by reference.

TECHNICAL FIELD

The present invention relates to a power conversion device and a switch device within the power conversion device. Further, the present invention relates to a motor drive device, an air blower, a compressor, an air conditioner, a refrigerator, and a freezer using the power conversion device and the switch device.

BACKGROUND

Conventionally, an inverter as one of power conversion devices is widely used. The inverter converts a direct current to an alternate current by controlling the conduction state of switching elements. The conduction state of a switching element (for example, an insulated gate bipolar transistor (IGBT)) is controlled by controlling a drive voltage to be applied between a gate and an emitter. A typical example of the inverter as described above is a three-phase inverter that converts a direct current to a three-phase alternate current by using six switching elements. The three-phase inverter is applied to, for example, an induction motor or a permanent magnet synchronous motor (hereinafter, "motor"). For example, such a motor as described above detects a motor current and executes control in accordance with the motor current. The motor uses a current-detecting shunt resistance for the current detection.

Patent Literature 1, for example, discloses a technique in which "a power-supply shunt resistance that detects a current between a DC power supply and an inverter device is provided, and between lower-arm switching elements and the negative side of the DC power supply, lower-arm shunt resistances for at least two phases are provided, each of which detects a phase current of the corresponding phase, such that a phase current which cannot be detected by the lower-arm shunt resistances is detected using the power-supply shunt resistance".

PATENT LITERATURE

Patent Literature 1: Japanese Patent Application Laid-open No. 2006-67747

However, according to the above conventional technique, a voltage drop occurs when a motor current flows through the shunt resistance. Therefore, the voltage from a reference potential of a gate drive circuit of the lower-arm switching element to an emitter terminal of the lower-arm switching element is varied. Accordingly, the gate-emitter voltage is varied. Thus, there is a problem in that the voltage variations cause erroneous control on the switching elements.

SUMMARY

The present invention has been achieved to solve the above problems, and an object of the present invention is to provide a switch device in a power conversion device that includes a shunt resistance and a switching element and that is capable of executing stable control.

In order to solve the aforementioned problems, a switch device provided within a power conversion device located between a power supply and a load, the switch device according to one aspect of the present invention is constructed as to include a switching element that includes a gate terminal, a gate drive circuit that applies a drive voltage to a gate terminal of the switching element, and a control unit that generates a drive signal to be supplied to the gate drive circuit, wherein a value obtained by subtracting a threshold voltage of the switching element from the drive voltage to be applied to the gate terminal of the switching element is greater than a product of a resistance value from an emitter of the switching element to a negative electrode of the gate drive circuit and a maximum current value that flows through the switching element.

According to the present invention, a switch device within a power conversion device that includes a shunt resistance and a switching element and that is capable of executing stable control can be obtained.

DETAILED DESCRIPTION

Exemplary embodiments of a power conversion device according to the present invention will be explained below in detail with reference to the accompanying drawings. The present invention is not limited to the embodiments.

It should be noted that the word "resistance value" in the following description may be replaced by "impedance value". Further, the transistor is not limited to a specific one, but can be an IGBT, an FET (Field Electric Transistor), or can be a bipolar type transistor. That is, the word "emitter" can be replaced by "source", the word "collector" can be replaced by "drain", and the ward "gate" can be replaced by "base".

First Embodiment

Figure 1:
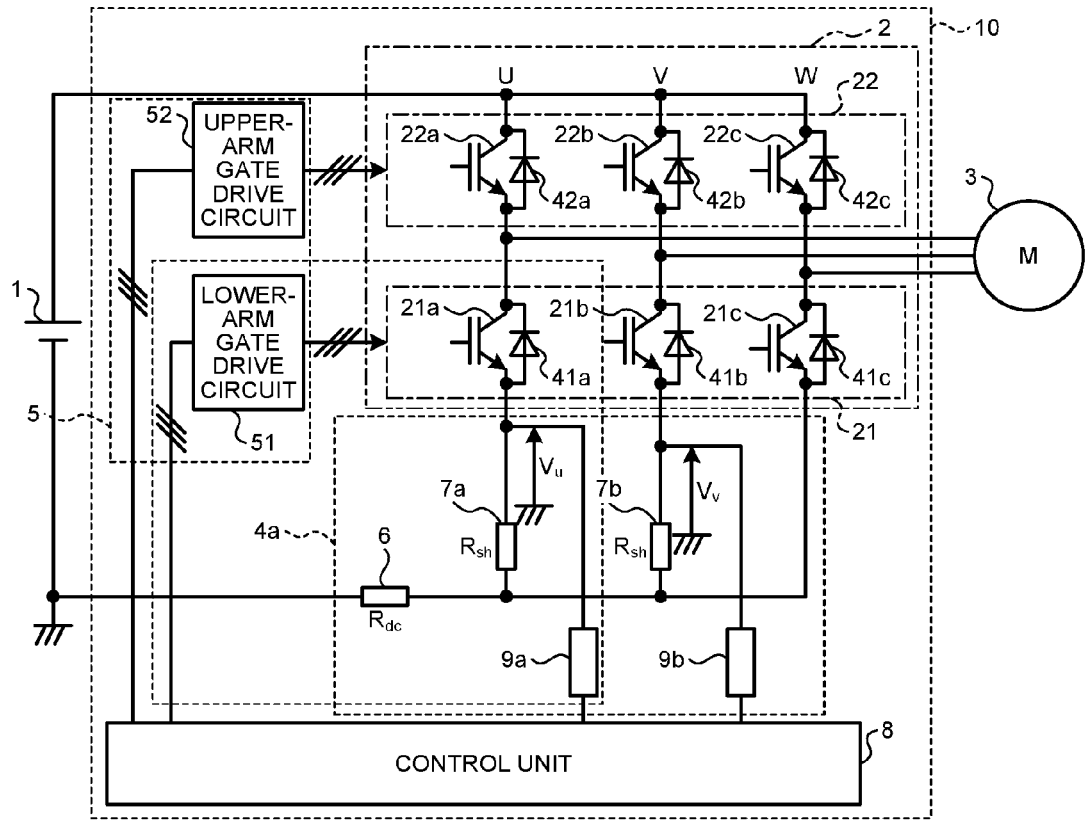
FIG. 1 is a diagram illustrating a configuration example of a power conversion device according to a first embodiment.

FIG. 1 is a diagram illustrating a configuration example of a power conversion device according to a first embodiment of the present invention. A power conversion device 10 illustrated in FIG. 1 is located between a DC power supply 1 and a motor 3, and converts DC power of the DC power supply 1, which is to be supplied to the motor 3 (load), to three-phase AC power.

The power conversion device 10 illustrated in FIG. 1 includes an inverter 2, a peripheral circuit unit 4a, a drive circuit unit 5, and a control unit 8.

The inverter 2 includes a lower arm portion 21 and an upper arm portion 22, and is configured by three legs. The lower arm portion 21 includes switching elements 21a to 21c. The switching element 21a is a U-phase lower-arm switching element. The switching element 21b is a V-phase lower-arm switching element. The switching element 21c is a W-phase lower-arm switching element. The upper arm portion 22 includes switching elements 22a to 22c. The switching element 22a is a U-phase upper-arm switching element. The switching element 22b is a V-phase upper-arm switching element. The switching element 22c is a W-phase upper-arm switching element.

The control unit 8 generates drive signals respectively for the switching elements 21a to 21c and 22a to 22c included in the inverter 2, and outputs the drive signals thereto. The control unit 8 is a controller that includes a microcomputer or a central processing unit (CPU) for example, and converts an input analog voltage signal (including a detection value) to a digital value to execute computation and control according to a control application of the motor 3.

The drive circuit unit 5 includes a lower-arm gate drive circuit 51 and an upper-arm gate drive circuit 52. The lower-arm gate drive circuit 51 applies, according to drive signals generated and output by the control unit 8, a drive voltage to respective gate terminals of the switching elements 21a to 21c. The upper-arm gate drive circuit 52 applies, according to drive signals generated and output by the control unit 8, a drive voltage to respective gate terminals of the switching elements 22a to 22c. Reflux diodes 41a to 41c and 42a to 42c are connected to the switching elements 21a to 21c and 22a to 22c, respectively, in inverse parallel.

The peripheral circuit unit 4a includes a power-supply shunt resistance 6, lower-arm shunt resistances 7a and 7b, and lower-arm voltage detection units 9a and 9b.

The power-supply shunt resistance 6 is provided between the inverter 2 and the negative-voltage (GND) side of the DC power supply 1. The resistance value of the power-supply shunt resistance 6 is represented as $R_{dc}$.

The lower-arm shunt resistances 7a and 7b are provided between the power-supply shunt resistance 6 and emitters of the respective switching elements 21a and 21b in the lower arm portion 21. The lower-arm shunt resistance 7a is a U-phase lower-arm shunt resistance. The lower-arm shunt resistance 7b is a V-phase lower-arm shunt resistance. The resistance value of the respective lower-arm shunt resistances 7a and 7b is represented as $R_{sh}$.

The lower-arm voltage detection unit 9a is provided between the control unit 8 and a connection point between the lower-arm shunt resistance 7a and the emitter of the switching element 21a in the lower arm portion 21. The lower-arm voltage detection unit 9b is provided between the control unit 8 and a connection point between the lower-arm shunt resistance 7b and the emitter of the switching element 21b in the lower arm portion 21. The lower-arm voltage detection unit 9a is a U-phase lower-arm voltage detection unit. The lower-arm voltage detection unit 9b is a V-phase lower-arm voltage detection unit. The lower-arm voltage detection unit 9a detects a voltage ($V_u$) between the negative-voltage (GND) side of the DC power supply 1 and the connection point between the lower-arm shunt resistance 7a and the emitter of the switching element 21a in the lower arm portion 21. The lower-arm voltage detection unit 9b detects a voltage ($V_v$) between the negative-voltage (GND) side of the DC power supply 1 and the connection point between the lower-arm shunt resistance 7b and the emitter of the switching element 21b in the lower arm portion 21.

Each of the lower-arm voltage detection units 9a and 9b is configured by, for example, an amplification unit that is capable of setting the voltages $V_u$ and $V_v$ to voltage values that are easily processed by the control unit 8. The control unit 8 calculates a motor current according to voltage values detected by the lower-arm voltage detection units 9a and 9b, and performs control computation, and in accordance with the calculated current value, the control unit 8 generates a drive signal.

Figure 2:
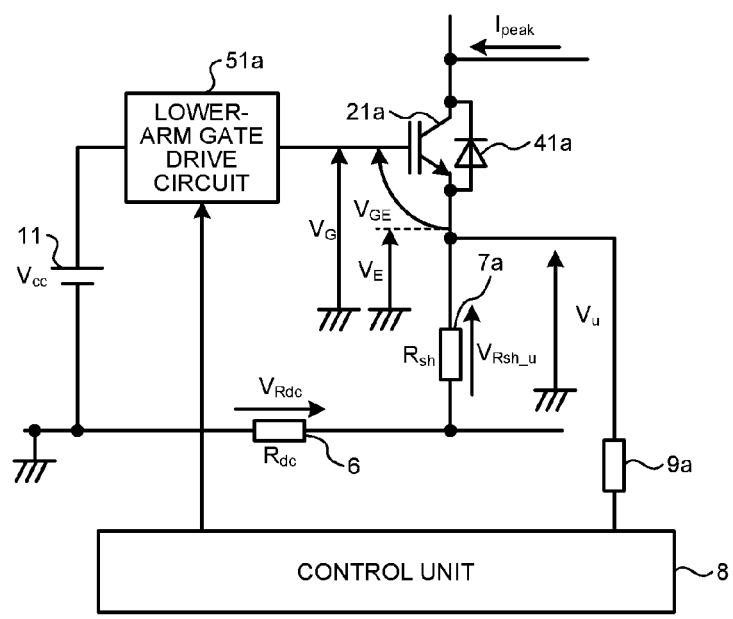
FIG. 2 is a diagram illustrating a configuration example of a peripheral circuit unit of the power conversion device according to the first embodiment.

Next, the peripheral circuit unit 4a is described in detail. FIG. 2 is a diagram illustrating a portion of the peripheral circuit unit 4a, which is connected to the switching element 21a (the U-phase lower-arm switching element), extracting the region surrounded by the dotted line in FIG. 1. A lower-arm gate drive circuit 51a that is a part of the lower-arm gate drive circuit 51 is connected to the gate terminal of the switching element 21a. The positive-voltage side (the positive side) of a DC power supply 11 is connected to the lower-arm gate drive circuit 51a.

According to a drive signal (an on/off signal) output from the control unit 8, the lower-arm gate drive circuit 51a changes over the voltage to be applied to the gate terminal of the switching element 21a. That is, when the switching element 21a is to be turned on, a voltage ($V_{cc}$) that is higher than a threshold voltage $V_{th}$ of the switching element 21a is applied to the gate terminal of the switching element 21a.

A gate-emitter voltage $V_{GE}$ in the switching element 21a is expressed as the following expression (1) by using an emitter terminal potential $V_E$ and a gate terminal potential $V_G$ relative to the reference potential (GND) of the lower-arm gate drive circuit 51a.

[Expression 1]

$$V_{GE} = V_G - V_E \tag{1}$$

The emitter terminal potential $V_E$ relative to the reference potential (GND) is expressed as the following expression (2) by using a voltage $V_{Rdc}$ across the power-supply shunt resistance 6 and a voltage $V_{Rsh\_u}$ across the lower-arm shunt resistance 7a.

[Expression 2]

$$V_E = V_{Rsh\_u} + V_{Rdc} \tag{2}$$

When a drive signal for turning on the switching element 21a is output from the control unit 8, the gate terminal potential $V_G$ relative to the reference potential (GND) is equal to a potential $V_{cc}$ on the positive-voltage side of the DC power supply 11 relative to the reference potential (GND). The gate-emitter voltage $V_{GE}$ in the switching element 21a is expressed as the following expression (3) by substituting the expression (2) into the above expression (1).

[Expression 3]

$$V_{GE} = V_{CC} - (V_{Rsh\_u} + V_{Rdc}) \tag{3}$$

The potential $V_{cc}$ on the positive-voltage side of the DC power supply 11 relative to the reference potential (GND) is a fixed value. Therefore, the gate-emitter voltage $V_{GE}$ in the switching element 21a is varied according to the voltage $V_{Rdc}$ across the power-supply shunt resistance 6 and the voltage $V_{Rsh\_u}$ ($=V_u$) across the lower-arm voltage detection unit 9a.

In order for the switching element 21a to maintain an on-state, the gate-emitter voltage $V_{GE}$ in the switching element 21a needs to be maintained so as to become greater than the threshold voltage $V_{th}$ of the switching element 21a, and therefore $V_{GE} > V_{th}$. When the above expression (3) is used, it is necessary to satisfy the following expression (4) in order for the switching element 21a to maintain the on-state.

[Expression 4]

$$V_{cc} - (V_{Rsh\_u} + V_{Rdc}) > V_{th} \quad (4)$$

A case in which the value on the left-hand side of the above expression (4) is minimized is considered. As described above, the potential $V_{cc}$ on the positive-voltage side of the DC power supply 11 relative to the reference potential (GND) is a fixed value. Therefore, when ($V_{Rsh\_u}$+$V_{Rdc}$) within the left-hand side of the above expression (4) is maximized, the value on the left-hand side of the above expression (4) becomes minimum. ($V_{Rsh\_u}$+$V_{Rdc}$) in the left-hand side of the above expression (4) becomes maximum when a peak value $I_{peak}$ of a motor current flows to the power-supply shunt resistance 6 and the lower-arm voltage detection unit 9a. That is, when ($V_{Rsh}\_u+V_{Rdc}$) in the left-hand side of the above expression (4) is maximized, it is expressed as the following expression (5).

[Expression 5]

$$V_{Rsh\_u} + V_{Rdc} = (R_{sh} + R_{dc}) \times I_{peak} \quad (5)$$

The following expression (6) is derived by substituting the above expression (5) into the above expression (4).

[Expression 6]

$$(R_{sh} + R_{dc}) \times I_{peak} < (V_{cc} - V_{th}) \quad (6)$$

The above expression (6) is the condition for the switching element 21a to maintain an on-state.

FIGS. 3A, 3B and 3C are schematic diagrams illustrating an example of a switching waveform (A) of the gate terminal potential $V_G$, and switching waveforms (B and C) of the gate-emitter voltage $V_{GE}$ in the power conversion device 10 according to the present embodiment of the invention.

The gate terminal potential $V_G$ becomes $V_{cc}$ when the switching element 21a is turned on, and becomes 0 V when the switching element 21a is turned off, according to a drive signal from the control unit 8. Therefore, the waveform of the gate terminal potential $V_G$ is a rectangular wave (FIG. 3(A)). The waveform of the gate-emitter voltage $V_{GE}$ is also a rectangular wave, however, it is offset in the negative direction by the amount of the emitter terminal potential $V_E$.

When the above expression (6) is not satisfied, the gate-emitter voltage $V_{GE}$ when the switching element 21a is on becomes lower than the threshold voltage $V_{th}$. Therefore, the switching element 21a is turned off (FIG. 3(B)). When the above expression (6) is satisfied, the gate-emitter voltage $V_{GE}$ when the switching element 21a is on does not become lower than the threshold voltage $V_{th}$ even with the offset amount taken into account. Therefore, the switching element 21a maintains an on-state (FIG. 3(C)).

Accordingly, in the present embodiment, by providing the power-supply shunt resistance 6 and the lower-arm shunt resistances 7a and 7b, that have a resistance value that satisfies the above expression (6), the switching element 21a can be driven stably.

As described above, each of the lower-arm voltage detection units 9a and 9b is configured by an amplification unit that sets the voltage value to a voltage that is easily processed by the control unit 8. Examples of such an amplification unit include an operational amplifier. However, since an operational amplifier generally has a dead zone, when an operational amplifier is used as an amplification unit, an input voltage of the operational amplifier is adjusted to be equal to or greater than the voltage in the dead zone.

As described above, a power conversion device that includes shunt resistances and switching elements and that is capable of executing stable control can be obtained.

Although not illustrated, the power conversion device 10 of the present embodiment can have a configuration in which an overcurrent is detected. Particularly, in the present invention, the resistance value of the shunt resistance is set according to an on-voltage of the switching element. Therefore, the resistance value is reduced and the current value can be increased. Accordingly, the configuration of detecting an overcurrent is effective. For example, the control unit 8 can include a current calculation unit and a comparison unit.

The current calculation unit uses a voltage value detected in the manner as described above and a resistance value of the shunt resistance to calculate a current value and output the calculated current value to the comparison unit.

The comparison unit includes a storage unit. The storage unit has an overcurrent threshold for overcurrent determination stored therein. The comparison unit compares the calculated current value with the overcurrent threshold. It can be configured such that, when the calculated current value is equal to or greater than the overcurrent threshold or the calculated current value exceeds the overcurrent threshold, the control unit 8 stops generating a drive signal and stops applying a drive voltage $V_{cc}$ to the switching element.

Second Embodiment

Figure 4:
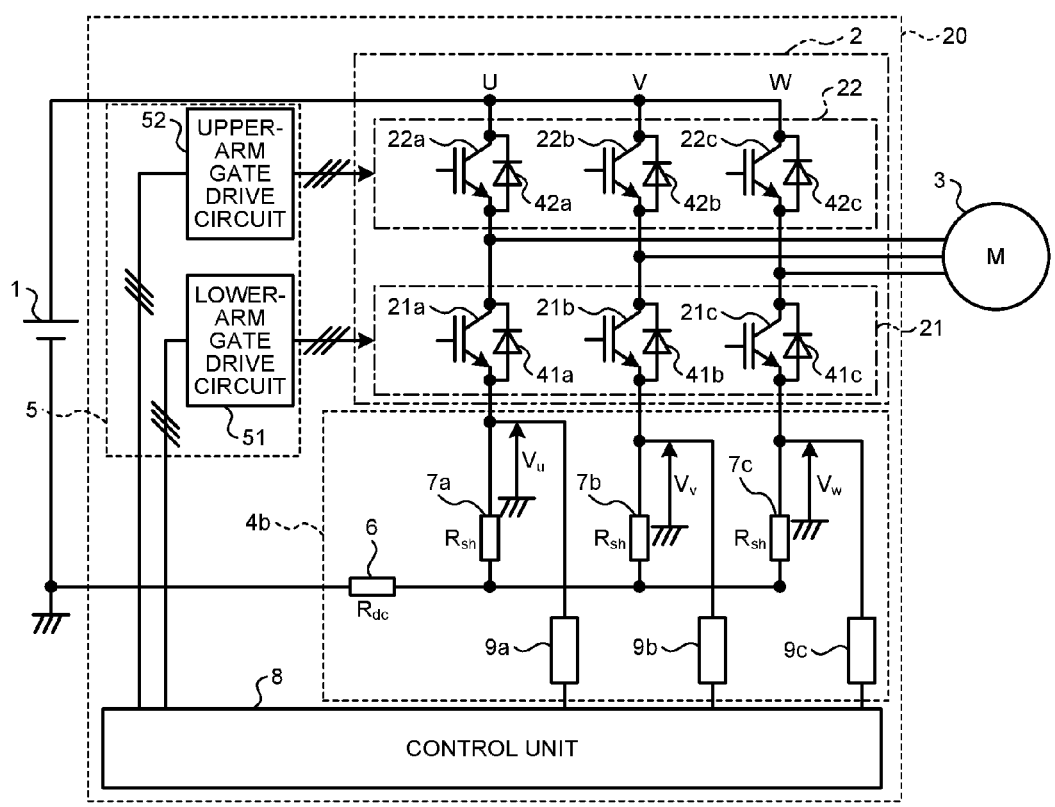
FIG. 4 is a diagram illustrating a configuration example of a power conversion device according to a second embodiment.

FIG. 4 is a diagram illustrating a configuration example of a power conversion device according to a second embodiment of the present invention. A power conversion device 20 illustrated in FIG. 4 is located between the DC power supply 1 and the motor 3, and converts DC power of the DC power supply 1 to be supplied to the motor 3 (load) to three-phase AC power.

The power conversion device 20 illustrated in FIG. 4 includes the inverter 2, a peripheral circuit unit 4b, the drive circuit unit 5, and the control unit 8. The inverter 2, the drive circuit unit 5, and the control unit 8 are identical to those described in the first embodiment.

The peripheral circuit unit 4b includes the power-supply shunt resistance 6, the lower-arm shunt resistances 7a and 7b and a lower-arm shunt resistance 7c, and the lower-arm voltage detection units 9a and 9b and a lower-arm voltage detection unit 9c. That is, the power conversion device 20 is different from the power conversion device 10 illustrated in FIG. 1 according to the first embodiment in that the power conversion device 20 includes the lower-arm shunt resistance 7c and the lower-arm voltage detection unit 9c. Other configurations are identical to those of the power conversion device 10 according to the first embodiment. Therefore, the descriptions thereof in the first embodiment are cited.

The lower-arm shunt resistance 7c is provided between the power-supply shunt resistance 6 and an emitter of the switching element 21c in the lower arm portion 21. The lower-arm shunt resistance 7c is a W-phase lower-arm shunt resistance. The resistance value of the lower-arm shunt resistance 7c is represented as $R_{sh}$.

The lower-arm voltage detection unit 9c is provided between the control unit 8 and a connection point between the lower-arm shunt resistance 7c with an emitter of the switching element 21c in the lower arm portion 21. The lower-arm voltage detection unit 9c is a W-phase lower-arm voltage detection unit. The lower-arm voltage detection unit 9c detects a voltage ($V_w$) between the negative-voltage (GND) side of the DC power supply 1 and the connection point between the lower-arm shunt resistance 7c and the emitter of the switching element 21c in the lower arm portion 21.

The lower-arm voltage detection unit 9c is configured by, for example, an amplification unit that is capable of setting the voltage $V_w$ to a voltage value that is easily processed by the control unit 8. The control unit 8 calculates a motor current according to a voltage value detected by the lower-arm voltage detection units 9a, 9b, and 9c, and performs control computation.

Also in the present embodiment, by providing the power-supply shunt resistance 6 having a resistance value that satisfies the expression (6) in the first embodiment, and the lower-arm voltage detection unit 9a, the switching element 21a can be driven stably.

As described above, a lower-arm shunt resistance and a lower-arm voltage detection unit can be provided to each of the three phases.

Similarly to the first embodiment, the power conversion device 20 of the present embodiment can have a configuration in which an overcurrent is detected.

Third Embodiment

Figure 5:
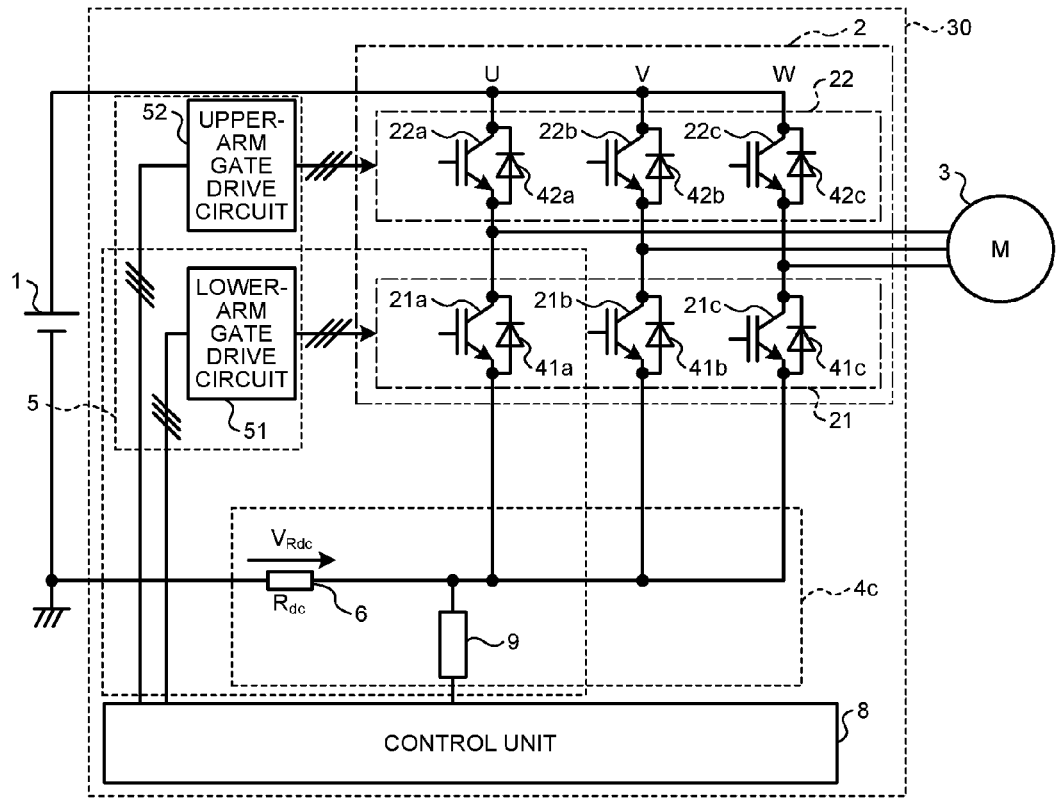
FIG. 5 is a diagram illustrating a configuration example of a power conversion device according to a third embodiment.

FIG. 5 is a diagram illustrating a configuration example of a power conversion device according to a third embodiment of the present invention. A power conversion device 30 illustrated in FIG. 5 is located between the DC power supply 1 and the motor 3, and converts DC power of the DC power supply 1 to be supplied to the motor 3 (load) to three-phase AC power.

The power conversion device 30 illustrated in FIG. 5 includes the inverter 2, a peripheral circuit unit 4c, the drive circuit unit 5, and the control unit 8. The inverter 2, the drive circuit unit 5, and the control unit 8 are identical to those described in the first embodiment.

The peripheral circuit unit 4c includes the power-supply shunt resistance 6 and a power-supply shunt-voltage detection unit 9. That is, the power conversion device 30 is different from the power conversion device 10 illustrated in FIG. 1 according to the first embodiment in that the power conversion device 30 includes neither the lower-arm shunt resistances 7a and 7b nor the lower-arm voltage detection units 9a and 9b, but includes the power-supply shunt-voltage detection unit 9. Other configurations are identical to those of the power conversion device 10 according to the first embodiment. Therefore, the descriptions thereof in the first embodiment are cited.

The power-supply shunt-voltage detection unit 9 is provided between the power-supply shunt resistance 6 and the emitters of the switching elements 21a to 21c in the lower arm portion 21, and detects the voltage ($V_{Rdc}$) between the negative-voltage (GND) side of the DC power supply 1 and the emitter-side of the switching elements 21a to 21c in the lower arm portion 21.

The power-supply shunt-voltage detection unit 9 is configured by, for example, an amplification unit that is capable of setting the voltage $V_{Rdc}$ to a voltage value that is easily processed by the control unit 8. The control unit 8 calculates a motor current according to a voltage value detected by the power-supply shunt-voltage detection unit 9, and performs control computation.

Figure 6:
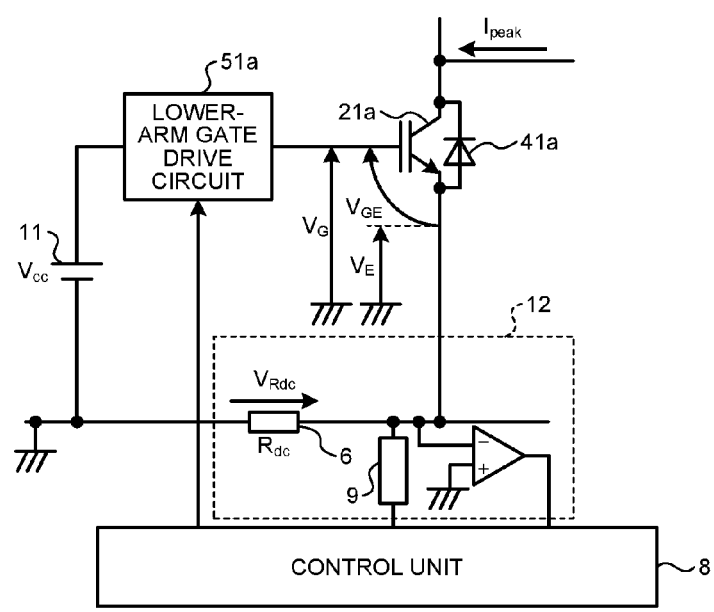
FIG. 6 is a diagram illustrating a configuration example of a peripheral circuit unit of the power conversion device according to the third embodiment.

Next, the peripheral circuit unit 4c is described in detail. FIG. 6 is a diagram illustrating a portion of the peripheral circuit unit 4c, which is connected to the switching element 21a (the U-phase lower-arm switching element), extracting the region surrounded by the dotted line in FIG. 5 and corresponding to FIG. 2 according to the first embodiment. The lower-arm gate drive circuit 51a that is a part of the lower-arm gate drive circuit 51 is connected to the gate terminal of the switching element 21a. The positive-voltage side of the DC power supply 11 is connected to the gate drive circuit 51a.

According to a drive signal (an on/off signal) output from the control unit 8, the lower-arm gate drive circuit 51a changes over the voltage to be applied to the gate terminal of the switching element 21a. That is, when the switching element 21a is to be turned on, a voltage ($V_{cc}$) that is higher than the threshold voltage $V_{th}$ of the switching element 21a is applied to the gate terminal of the switching element 21a.

The gate-emitter voltage $V_{GE}$ in the switching element 21a is expressed as the expression (1) in the first embodiment by using the emitter terminal potential $V_E$ and the gate terminal potential $V_G$ relative to the reference potential (GND) of the lower-arm gate drive circuit 51a. The emitter terminal potential $V_E$ is expressed as the following expression (7) by using the voltage $V_{Rdc}$.

[Expression 7]

$$V_E - V_{Rdc} \qquad (7)$$

When a drive signal for turning on the switching element 21a is output from the control unit 8, the gate terminal potential $V_G$ relative to the reference potential (GND) is equal to the potential $V_{cc}$ on the positive-voltage side of the DC power supply 11 relative to the reference potential (GND). The gate-emitter voltage $V_{GE}$ in the switching element 21a is expressed as the following expression (8) by substituting the expression (7) into the above expression (1).

[Expression 8]

$$V_{GE} = V_{cc} - V_{Rdc} \qquad (8)$$

The potential $V_{cc}$ on the positive-voltage side of the DC power supply 11 relative to the reference potential (GND) is a fixed value. Therefore, the gate-emitter voltage $V_{GE}$ in the switching element 21a is varied according to the voltage $V_{Rdc}$ across the power-supply shunt resistance 6.

In order for the switching element 21a to maintain an on-state, the gate-emitter voltage $V_{GE}$ in the switching element 21a needs to be maintained so as to be greater than the threshold voltage $V_{th}$ of the switching element 21a, and therefore $V_{GE} > V_{th}$. When the above expression (8) is used, it is necessary to satisfy the following expression (9) in order for the switching element 21a to maintain the on-state.

[Expression 9]

$$V_{cc} - V_{Rdc} > V_{th} \qquad (9)$$

A case is considered where the value on the left-hand side of the above expression (9) is minimized. As described above, the potential $V_{cc}$ on the positive-voltage side of the DC power supply 11 relative to the reference potential (GND) is a fixed value. Therefore, when the voltage $V_{Rdc}$ is maximized, the value on the left-hand side of the above expression (9) becomes minimum. The voltage $V_{Rdc}$ becomes maximum when the peak value $I_{peak}$ of the motor current flows to the power-supply shunt resistance 6. This is expressed as the following expression (10).

[Expression 10]

$$V_{Rdc} = R_{dc} \times I_{peak} \quad (10)$$

The following expression (11) is derived by substituting the above expression (10) into the above expression (9).

[Expression 11]

$$R_{dc} \times I_{peak} < (V_{cc} - V_{th}) \quad (11)$$

The above expression (11) is the condition for the switching element 21a to maintain the on-state.

Figure 3:
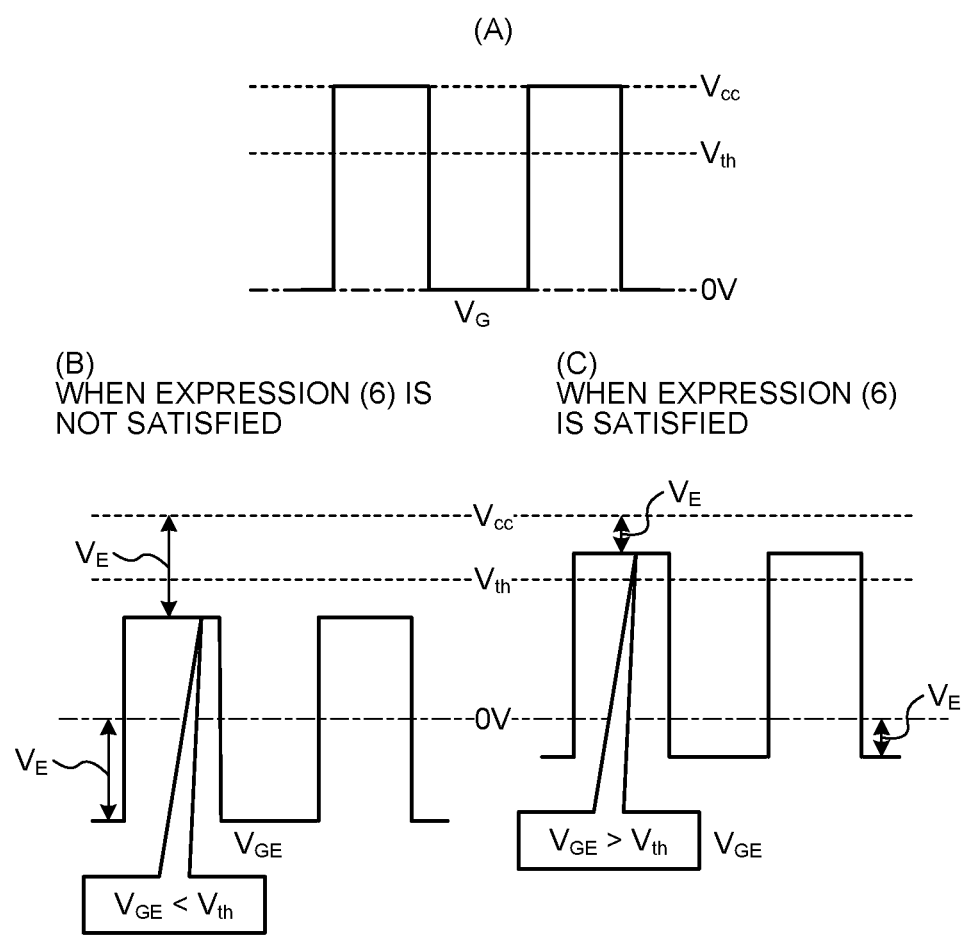
FIGS. 3A, 3B and 3C are diagrams illustrating an example of a switching waveform of the power conversion device according to the first embodiment.

Similarly to the descriptions with reference to FIG. 3 in the first embodiment, the gate terminal potential $V_G$ becomes $V_{cc}$ when the switching element 21a is turned on and becomes 0 V when the switching element 21a is turned off, according to a drive signal from the control unit 8. Therefore, the waveform of the gate terminal potential $V_G$ is a rectangular wave. The waveform of the gate-emitter voltage $V_{GE}$ is also a rectangular wave, however, it is offset in the negative direction by the amount of the emitter terminal potential $V_E$ (the voltage $V_{Rdc}$). When the above expression (11) is not satisfied, the gate-emitter voltage $V_{GE}$ when the switching element 21a is on becomes lower than the threshold voltage $V_{th}$. Therefore, the switching element 21a is turned off. When the above expression (11) is satisfied, the gate-emitter voltage $V_{GE}$ when the switching element 21a is on does not become lower than the threshold voltage $V_{th}$ even with the offset amount taken into account. Therefore, the switching element 21a maintains the on-state.

Accordingly, in the present embodiment, by providing the power-supply shunt resistance 6 that has a resistance value that satisfies the above expression (11), the switching element 21a can be driven stably.

Similarly to the first and second embodiments, examples of the amplification unit that constitutes the power-supply shunt-voltage detection unit 9 include an operational amplifier. Since an operational amplifier generally has a dead zone, when an operational amplifier is used as an amplification unit, an input voltage of the operational amplifier is adjusted to be equal to or greater than the voltage in the dead zone.

As described above, even when the power conversion device does not include a lower-arm shunt resistance or a lower-arm voltage detection unit, by including a power-supply shunt resistance and a power-supply shunt-voltage detection unit, a power conversion device that includes a shunt resistance and a switching element and that is capable of executing stable control can be obtained. According to the configuration of the present embodiment, the number of elements can be reduced as compared to the first and second embodiments.

Similarly to the first embodiment, while the power conversion device 30 of the present embodiment can have a configuration in which an overcurrent is detected, it can be configured such that an overcurrent detection unit 12 illustrated in FIG. 6 directly uses a shunt-resistance potential to perform overcurrent detection by means of hardware.

Fourth Embodiment

Figure 7:
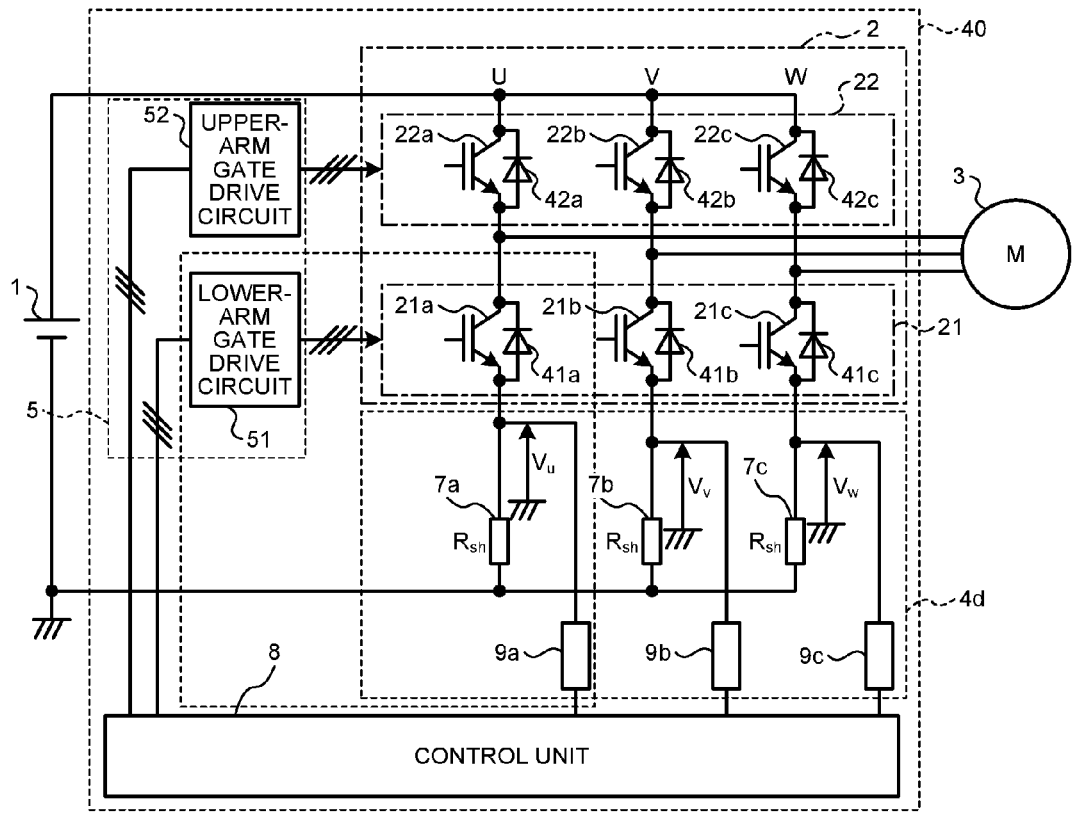
FIG. 7 is a diagram illustrating a configuration example of a power conversion device according to a fourth embodiment.

FIG. 7 is a diagram illustrating a configuration example of a power conversion device according to a fourth embodiment of the present invention. A power conversion device 40 illustrated in FIG. 7 is located between the DC power supply 1 and the motor 3, and converts DC power of the DC power supply 1 to be supplied to the motor 3 (load) to three-phase AC power.

The power conversion device 40 illustrated in FIG. 7 includes the inverter 2, a peripheral circuit unit 4d, the drive circuit unit 5, and the control unit 8.

The inverter 2, the drive circuit unit 5, and the control unit 8 are identical to those described in the first embodiment.

The peripheral circuit unit 4d includes the lower-arm shunt resistances 7a, 7b, and 7c, and the lower-arm voltage detection units 9a, 9b, and 9c. That is, the power conversion device 40 is different from the power conversion device 10 illustrated in FIG. 1 according to the first embodiment in that the power conversion device 40 does not include the power-supply shunt resistance 6, but includes the lower-arm shunt resistance 7c and the lower-arm voltage detection unit 9c. Other configurations are identical to those of the power conversion device 10 according to the first embodiment. Therefore, the descriptions thereof in the first embodiment are cited. The power conversion device 40 is different from the power conversion device 20 illustrated in FIG. 4 according to the second embodiment in that the power conversion device 40 does not include the power-supply shunt resistance 6.

The lower-arm shunt resistances 7a, 7b, and 7c are provided between the negative-voltage side (the GND side) of the DC power supply 1 and respective emitters of the switching elements 21a, 21b, and 21c in the lower arm portion 21. The lower-arm shunt resistance 7a is a U-phase lower-arm shunt resistance. The lower-arm shunt resistance 7b is a V-phase lower-arm shunt resistance. The lower-arm shunt resistance 7c is a W-phase lower-arm shunt resistance. The resistance value of the respective lower-arm shunt resistances 7a, 7b, and 7c is represented as $R_{sh}$.

The lower-arm voltage detection unit 9a is provided between the control unit 8 and the connection point between the lower-arm shunt resistance 7a and the emitter of the switching element 21a in the lower arm portion 21. The lower-arm voltage detection unit 9b is provided between the control unit 8 and the connection point between the lower-arm shunt resistance 7b and the emitter of the switching element 21b in the lower arm portion 21. The lower-arm voltage detection unit 9c is provided between the control unit 8 and the connection point between the lower-arm shunt resistance 7c and the emitter of the switching element 21c in the lower arm portion 21. The lower-arm voltage detection unit 9a is a U-phase lower-arm voltage detection unit. The lower-arm voltage detection unit 9b is a V-phase lower-arm voltage detection unit. The lower-arm voltage detection unit 9c is a W-phase lower-arm voltage detection unit. The lower-arm voltage detection unit 9a detects a voltage ($V_u$) between the negative-voltage (GND) side of the DC power supply 1 and the connection point between the lower-arm shunt resistance 7a and the emitter of the switching element 21a in the lower arm portion 21. The lower-arm voltage detection unit 9b detects a voltage ($V_v$) between the negative-voltage (GND) side of the DC power supply 1 and the connection point between the lower-arm shunt resistance 7b and the emitter of the switching element 21*b* in the lower arm portion 21. The lower-arm voltage detection unit 9*c* detects a voltage ($V_w$) between the negative-voltage (GND) side of the DC power supply 1 and the connection point between the lower-arm shunt resistance 7*c* and the emitter of the switching element 21*c* in the lower arm portion 21.

Each of the lower-arm voltage detection units 9*a*, 9*b*, and 9*c* is configured by, for example, an amplification unit that is capable of setting the voltages $V_u$, $V_v$, and $V_w$ to voltage values that are easily processed by the control unit 8. The control unit 8 calculates a motor current according to a voltage value detected by the lower-arm voltage detection units 9*a*, 9*b*, and 9*c*, and performs control computation.

Figure 8:
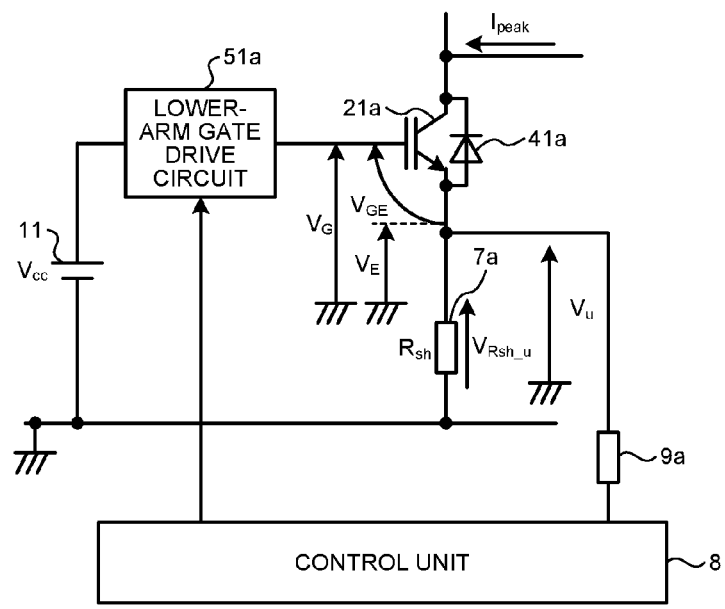
FIG. 8 is a diagram illustrating a configuration example of a peripheral circuit unit of the power conversion device according to the fourth embodiment.

Next, the peripheral circuit unit 4*d* is described in detail. FIG. 8 is a diagram illustrating a portion of the peripheral circuit unit 4*d*, which is connected to the switching element 21*a* (the U-phase lower-arm switching element), extracting the region surrounded by the dotted line in FIG. 7 and corresponding to FIG. 2 according to the first embodiment, or corresponding to FIG. 6 according to the third embodiment. The lower-arm gate drive circuit 51*a* that is a part of the lower-arm gate drive circuit 51 is connected to the gate terminal of the switching element 21*a*. The positive-voltage side of the DC power supply 11 is connected to the lower-arm gate drive circuit 51*a*.

According to a drive signal (an on/off signal) output from the control unit 8, the lower-arm gate drive circuit 51*a* changes over the voltage to be applied to the gate terminal of the switching element 21*a*. That is, when the switching element 21*a* is to be turned on, a voltage ($V_{cc}$) that is higher than the threshold voltage $V_{th}$ of the switching element 21*a* is applied to the gate terminal of the switching element 21*a*.

The gate-emitter voltage $V_{GE}$ in the switching element 21*a* is expressed as the expression (1) in the first embodiment by using the emitter terminal potential $V_E$ and the gate terminal potential $V_G$ relative to the reference potential (GND) of the lower-arm gate drive circuit 51*a*. The emitter terminal potential $V_E$ is expressed as the following expression (12) by using the voltage $V_{Rsh\_u}$ across the lower-arm shunt resistance 7*a*.

[Expression 12]

$$V_E = V_{Rsh\_u} \tag{12}$$

When a drive signal for turning on the switching element 21*a* is output from the control unit 8, the gate terminal potential $V_G$ relative to the reference potential (GND) is equal to the potential $V_{cc}$ on the positive-voltage side of the DC power supply 11 relative to the reference potential (GND). The gate-emitter voltage $V_{GE}$ in the switching element 21*a* is expressed as the following expression (13) by substituting the expression (12) into the above expression (1).

[Expression 13]

$$V_{GE} = V_{cc} - V_{Rsh\_u} \tag{13}$$

The potential $V_{cc}$ on the positive-voltage side of the DC power supply 11 relative to the reference potential (GND) is a fixed value. Therefore, the gate-emitter voltage $V_{GE}$ in the switching element 21*a* is varied according to the voltage $V_{Rdc}$ across the power-supply shunt resistance 6 and the voltage $V_{Rsh\_u}$ across the lower-arm voltage detection unit 9*a*.

In order for the switching element 21*a* to maintain the on-state, the gate-emitter voltage $V_{GE}$ in the switching element 21*a* needs to be maintained so as to become greater than the threshold voltage $V_{th}$ of the switching element 21*a*, and therefore $V_{GE} > V_{th}$. When the above expression (13) is used, it is necessary to satisfy the following expression (14) in order for the switching element 21*a* to maintain the on-state.

[Expression 14]

$$V_{cc} - V_{Rsh\_u} > V_{th} \tag{14}$$

A case in which the value on the left-hand side of the above expression (14) is minimized is considered. As described above, the potential $V_{cc}$ on the positive-voltage side of the DC power supply 11 relative to the reference potential (GND) is a fixed value. Therefore, when the voltage $V_{Rsh\_u}$ is maximized, the value on the left-hand side of the above expression (14) becomes minimum. The voltage $V_{Rsh\_u}$ becomes maximum when the peak value $I_{peak}$ of a motor current flows to the lower-arm shunt resistance 7*a*. That is, when the voltage $V_{Rsh\_u}$ in the above expression (14) is maximized, it is expressed as the following expression (15).

[Expression 15]

$$V_{Rsh\_u} = R_{sh} \times I_{peak} \tag{15}$$

The following expression (16) is derived by substituting the above expression (15) into the above expression (14).

[Expression 16]

$$R_{sh} \times I_{peak} < (V_{cc} - V_{th}) \tag{16}$$

The above expression (16) is the condition for the switching element 21*a* to maintain an on-state.

Similarly to the descriptions with reference to FIG. 3 in the first embodiment, the gate terminal potential $V_G$ becomes $V_{cc}$ when the switching element 21*a* is turned on and becomes 0 V when the switching element 21*a* is turned off, according to a drive signal from the control unit 8. Therefore, the waveform of the gate terminal potential $V_G$ is a rectangular wave. The waveform of the gate-emitter voltage $V_{GE}$ is also a rectangular wave, however, it is offset in the negative direction by the amount of the emitter terminal potential $V_E$ (the voltage $V_{Rsh\_u}$). When the above expression (16) is not satisfied, the gate-emitter voltage $V_{GE}$ when the switching element 21*a* is on becomes lower than the threshold voltage $V_{th}$. Therefore, the switching element 21*a* is turned off. When the above expression (16) is satisfied, the gate-emitter voltage $V_{GE}$ when the switching element 21*a* is on does not become lower than the threshold voltage $V_{th}$ even with the offset amount taken into account. Therefore, the switching element 21*a* maintains the on-state.

Accordingly, in the present embodiment, by providing the lower-arm shunt resistances 7*a*, 7*b*, and 7*c* that have a resistance value that satisfies the above expression (16), the switching element 21*a* can be driven stably.

Similarly to the first to third embodiments, examples of the amplification unit that constitutes each of the lower-arm voltage detection units 9*a*, 9*b*, and 9*c* include an operational amplifier. Since an operational amplifier generally has a dead zone, when an operational amplifier is used as an amplification unit, an input voltage of the operational amplifier is adjusted to be equal to or greater than the voltage in the dead zone.

As described above, even when the power conversion device does not include a power-supply shunt resistance, by including lower-arm shunt resistances and lower-arm voltage detection units corresponding to all the phases, a power conversion device that includes a shunt resistance and a switching element and that is capable of executing stable control can be obtained.

Similarly to the first embodiment, the power conversion device 40 of the present embodiment may have a configuration of detecting an overcurrent.

Fifth Embodiment

Figure 9:
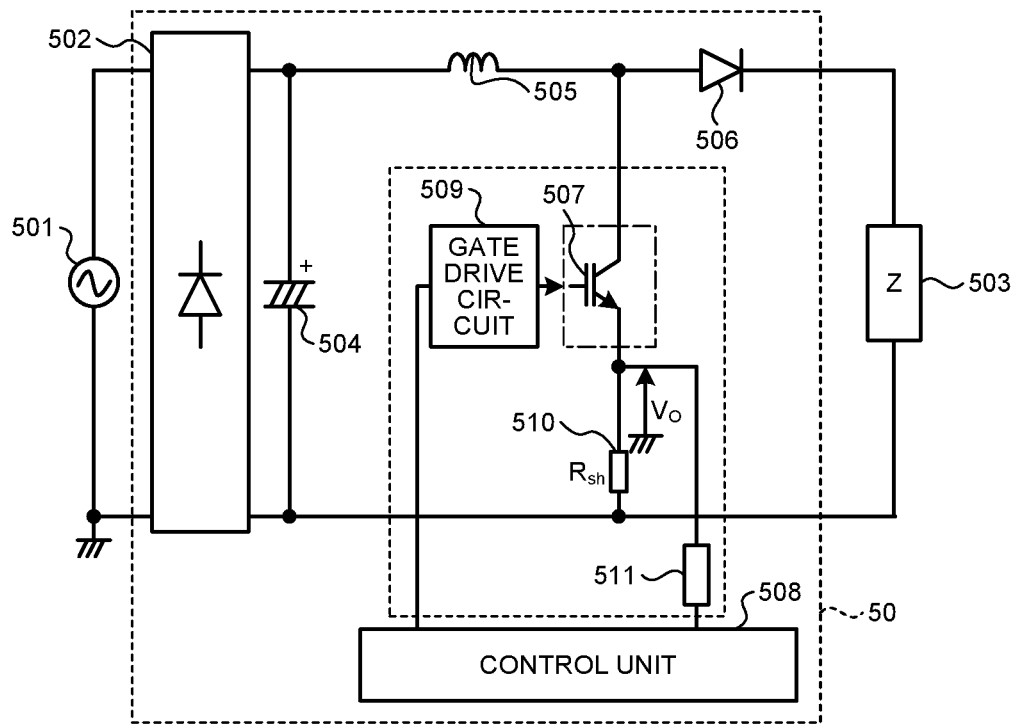
FIG. 9 is a diagram illustrating a configuration example of a power conversion device according to a fifth embodiment.

FIG. 9 is a diagram illustrating a configuration example of a power conversion device according to a fifth embodiment of the present invention. A power conversion device 50 illustrated in FIG. 9 is located between an AC power supply 501 and a load 503. The power conversion device 50 converts AC power supplied from the AC power supply 501 to DC power, and boosts the voltage of this DC power to be supplied to the load 503.

The power conversion device 50 illustrated in FIG. 9 includes a rectifying circuit 502, a smoothing capacitor 504, a reactor 505, a backflow prevention diode 506, a switching element 507, a control unit 508, and a gate drive circuit 509.

The rectifying circuit 502 converts AC power supplied from the AC power supply 501 to DC power. The smoothing capacitor 504 smooths a DC voltage output from the rectifying circuit 502. The reactor 505 is connected to the positive-voltage side of the smoothing capacitor 504. The backflow prevention diode 506 prevents backflow of a current from the load 503. The switching element 507 executes short-circuit control. The control unit 508 generates a drive signal for the switching element 507 and outputs the drive signal. The control unit 508 is a controller that is configured by a microcomputer or a CPU for example, and converts an input analog voltage signal to a digital value to control the voltage or the current to be supplied to the load 503. According to a drive signal output from the control unit 508, the gate drive circuit 509 applies a drive voltage to a gate terminal of the switching element 507.

The power conversion device 50 illustrated in FIG. 9 further includes a shunt resistance 510 and a shunt-resistance voltage detection unit 511. The shunt resistance 510 is provided between an emitter terminal of the switching element 507 and the negative-voltage side of the AC power supply 501. The shunt-resistance voltage detection unit 511 is provided between the negative-voltage side of the AC power supply 501 and a connection point between the shunt resistance 510 and the switching element 507. The resistance value of the shunt resistance 510 is represented as $R_{sh}$.

The shunt-resistance voltage detection unit 511 is configured by, for example, an amplification unit that is capable of setting a voltage $V_0$ of the shunt resistance 510 to a voltage value that is easily processed by the control unit 508. The control unit 508 controls the voltage and the current to be supplied to the load 503, according to a voltage value detected by the shunt-resistance voltage detection unit 511.

Figure 10:
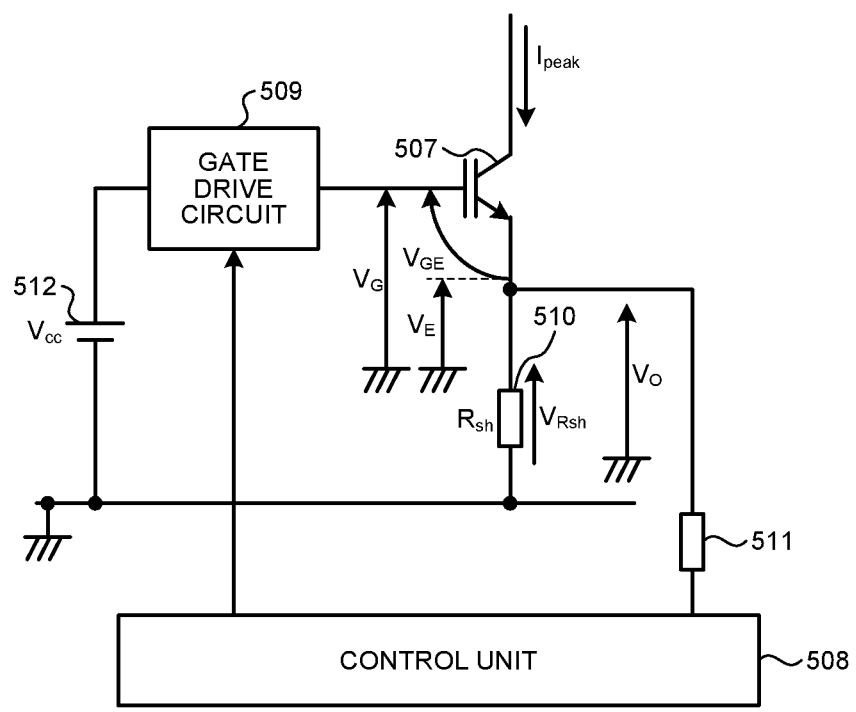
FIG. 10 is a diagram illustrating a configuration example of a peripheral circuit unit of the power conversion device according to the fifth embodiment.

Next, a peripheral circuit unit of the power conversion device 50 is described in detail. FIG. 10 is a diagram illustrating a portion of the peripheral circuit unit of the power conversion device 50, which is connected to the switching element 507, extracting the region surrounded by the dotted line in FIG. 9. A gate drive circuit 509 is connected to the gate terminal of the switching element 507. The positive-voltage side of a DC power supply 512 is connected to the gate drive circuit 509.

According to a drive signal (an on/off signal) output from the control unit 508, the gate drive circuit 509 changes over the voltage to be applied to the gate terminal of the switching element 507. That is, when the switching element 507 is to be turned on, a voltage ($V_{cc}$) that is higher than a threshold voltage $V_{th}$ of the switching element 507 is applied to the gate terminal of the switching element 507.

The gate-emitter voltage $V_{GE}$ in the switching element 507 is expressed as the expression (1) in the first embodiment by using the emitter terminal potential $V_E$ and the gate terminal potential $V_G$ relative to the reference potential (GND) of the gate drive circuit 509. The emitter terminal potential $V_E$ is expressed as the following expression (17) by using the voltage $V_{Rsh}$ across the shunt resistance 510.

[Expression 17]

$$V_E = V_{Rsh} \quad (17)$$

When a drive signal for turning on the switching element 507 is output from the control unit 508, the gate terminal potential $V_G$ relative to the reference potential (GND) is equal to the potential $V_{cc}$ on the positive-voltage side of the DC power supply 512 relative to the reference potential (GND). The gate-emitter voltage $V_{GE}$ in the switching element 507 is expressed as the following expression (18) by substituting the expression (17) into the above expression (1).

[Expression 18]

$$V_{GE} = V_{cc} - V_{Rsh} \quad (18)$$

The potential $V_{cc}$ on the positive-voltage side of the DC power supply 512 relative to the reference potential (GND) is a fixed value. Therefore, the gate-emitter voltage $V_{GE}$ in the switching element 507 is varied according to the voltage $V_{Rsh}$ across the shunt resistance 510.

In order for the switching element 507 to maintain an on-state, the gate-emitter voltage $V_{GE}$ in the switching element 507 needs to be maintained so as to become greater than the threshold voltage $V_{th}$ of the switching element 507, and thus $V_{GE} > V_{th}$. When the above expression (18) is used, it is necessary to satisfy the following expression (19) in order for the switching element 507 to maintain the on-state.

[Expression 19]

$$V_{cc} - V_{Rsh} > V_{th} \quad (19)$$

A case in which the value on the left-hand side of the above expression (19) is minimized is considered. As described above, the potential $V_{cc}$ on the positive-voltage side of the DC power supply 512 relative to the reference potential (GND) is a fixed value. Therefore, when the voltage $V_{Rsh}$ is maximized, the value on the left-hand side of the above expression (14) becomes minimum. The voltage $V_{Rsh}$ becomes maximum when the peak value $I_{peak}$ of a motor current flows to the shunt resistance 510. That is, when the voltage $V_{Rsh}$ in the above expression (19) is maximized, it is expressed as the following expression (20).

[Expression 20]

$$V_{Rsh} = R_{sh} \times I_{peak} \quad (20)$$

The following expression (21) is derived by substituting the above expression (20) into the above expression (19).

[Expression 21]

$$R_{sh} \times I_{peak} < (V_{cc} - V_{th}) \quad (21)$$

Identically to the descriptions with reference to FIG. 3A, 3B 3C in the first embodiment, the gate terminal potential $V_G$ becomes $V_{cc}$ when the switching element 507 is turned on and becomes 0 V when the switching element 507 is turned off, according to a drive signal from the control unit 8. Therefore, the waveform of the gate terminal potential $V_G$ is a rectangular wave. The waveform of the gate-emitter voltage $V_{GE}$ is also a rectangular wave, however, it is offset in the negative direction by the amount of the emitter terminal potential $V_E$ (the voltage $V_{Rsh\_u}$). When the above expression (21) is not satisfied, the gate-emitter voltage $V_{GE}$ when the switching element 507 is on becomes lower than the threshold voltage $V_{th}$. Therefore, the switching element 507 is turned off. When the above expression (21) is satisfied, the gate-emitter voltage $V_{GE}$ when the switching element 21a is on does not become lower than the threshold voltage $V_{th}$ even with the offset amount taken into account. Therefore, the switching element 507 maintains an on-state.

Accordingly, in the present embodiment, by providing the shunt resistance 510 that has a resistance value that satisfies the above expression (21), the switching element 507 can be driven stably.

Similarly to the first to fourth embodiments, examples of the amplification unit that constitutes the shunt-resistance voltage detection unit 511 include an operational amplifier. Since an operational amplifier generally has a dead zone, when an operational amplifier is used as an amplification unit, an input voltage of the operational amplifier is adjusted to be equal to or greater than the voltage within the dead zone.

As described above, a power conversion device that includes a shunt resistance and a switching element and that is capable of executing stable control can be obtained.

While in the first to fifth embodiments described above, examples in which the power conversion device converts DC power of the DC power supply 1 to three-phase AC power have been described, the present invention is not limited thereto. The present invention can be also configured such that the power conversion device converts DC power of the DC power supply 1 to single-phase AC power.

The power conversion device described in the first to fifth embodiments has exemplified a motor as a load, and therefore the motor can be applied to a motor drive device in the above manner. Such a motor drive device can be applied to an air blower or a compressor installed in an air conditioner, a refrigerator, or a freezer.

The invention claimed is:

1. A switch device comprising:
   a switching element that includes a gate terminal;
   a gate drive circuit that applies a drive voltage to the gate terminal; and
   a control unit that generates a gate signal to be supplied to the gate drive circuit, wherein
   a difference between a threshold voltage of the switching element and the drive voltage to be applied to the gate terminal is greater than a difference between an emitter potential of the switching element and a reference potential of the gate drive circuit.

2. A power conversion device, which is located between a DC power supply and a load and includes at least one of the switch device according to claim 1.

3. A power conversion device, which is located between a DC power supply and a load and includes a plurality of the switch devices according to claim 1, in which an arm having an upper arm portion and a lower arm portion is provided.

4. The power conversion device according to claim 3, wherein
   the arm includes three legs connected in parallel, and
   the power conversion device supplies three-phase AC power to the load.

5. The power conversion device according to claim 4, wherein
   at least two of the three legs further include
   a lower-arm shunt resistance that is connected between an emitter terminal of the switching element and a negative-side terminal of the DC power supply, and
   a lower-arm voltage detection unit that detects a potential between the lower-arm shunt resistance and an emitter terminal of the switching element with respect to a negative-side terminal of the DC power supply, and
   a leg that includes neither the lower-arm shunt resistance nor the lower-arm voltage detection unit further includes a power-supply shunt resistance that is connected between an emitter terminal of the switching element and a negative-side terminal of the DC power supply.

6. The power conversion device according to claim 4, further comprising:
   a power-supply shunt resistance that is connected between an emitter terminal of the switching element and a negative-side terminal of the DC power supply; and
   a power-supply shunt-voltage detection unit that detects a potential between the power-supply shunt resistance and an emitter terminal of the switching element relative to a negative-side terminal of the DC power supply.

7. The power conversion device according to claim 4, wherein
   at least two of the three legs further include
   a lower-arm shunt resistance that is connected between an emitter terminal of the switching element and a negative-side terminal of the DC power supply, and
   a lower-arm voltage detection unit that detects a potential between the lower-arm shunt resistance and an emitter terminal of the switching element relative to a negative-side terminal of the DC power supply.

8. The power conversion device according to claim 6, wherein
   a current value that flows to the load is equal to a current value that flows through the switching element,
   the control unit calculates a current value that flows to the load according to a voltage value detected by the power-supply shunt-voltage detection unit, and
   the control unit generates a gate signal for a switching element within the arm according to the current value.

9. The power conversion device according to claim 6, wherein the control unit performs overcurrent detection on the load according to a voltage value detected by the power-supply shunt-voltage detection unit.

10. The power conversion device according to claim 6, wherein
    the control unit includes a current calculation unit and a comparison unit,
    the current calculation unit calculates a current value of the load according to a voltage value detected by the power-supply shunt-voltage detection unit, and outputs a calculated current value to the comparison unit,
    the comparison unit includes a storage unit that has an overcurrent threshold for overcurrent determination stored therein, and compares the calculated current value with the overcurrent threshold, and
    the control unit performs overcurrent detection by determining that an overcurrent has been detected when the calculated current value is equal to or greater than the overcurrent threshold, or when the calculated current value exceeds the overcurrent threshold.

11. The power conversion device according to claim 8, wherein upon detecting an overcurrent, the control unit stops generating the gate signal.

12. The power conversion device according to claim 11, wherein the control unit stops generating the gate signal to interrupt a drive voltage to a gate terminal of the switching element.

13. A power conversion device located between an AC power supply and a load, the power conversion device comprising:
   a rectifying circuit that rectifies a voltage of the AC power supply;
   a smoothing unit that is provided closer to the load than the rectifying circuit, and that smooths a DC voltage rectified by the rectifying circuit;
   a reactor that is provided closer to the load than the smoothing unit;
   a backflow prevention element that is provided at a subsequent stage of the reactor, and that prevents backflow of a current toward the AC power supply from the smoothing unit; and
   the switch device according to claim 1, which is located between the reactor and the backflow prevention element, wherein
   the switch device causes a positive side and a negative side of the rectifying circuit to be short circuited according to the gate signal generated by the control unit.

14. The power conversion device according to claim 13, further comprising:
   a shunt resistance that is inserted on a negative side of the rectifying circuit; and
   a negative-side shunt-resistance voltage detection unit that detects a potential between the shunt resistance and the switching element within the switch device relative to a potential on a negative side of the rectifying circuit, wherein
   the control unit generates the gate signal according to a detection value of the negative-side shunt-resistance voltage detection unit.

15. The power conversion device according to claim 14, wherein the control unit performs overcurrent detection according to a detection value of the negative-side shunt-resistance voltage detection unit.

16. The power conversion device according to claim 14, wherein
   the control unit includes a current calculation unit and a comparison unit,
   the current calculation unit calculates a current value of the load according to a voltage value detected by the negative-side shunt-resistance voltage detection unit, and outputs a calculated current value to the comparison unit,
   the comparison unit includes a storage unit that has an overcurrent threshold for overcurrent determination stored therein, and compares the calculated current value with the overcurrent threshold, and
   the control unit performs overcurrent detection by determining that an overcurrent has been detected when the calculated current value is equal to or greater than the overcurrent threshold, or when the calculated current value exceeds the overcurrent threshold.

17. The switch device according to claim 1, wherein the difference between the emitter potential of the switching element and the reference potential of the gate drive circuit includes a product of a resistance value from an emitter of the switching element to the reference potential of the gate drive circuit and a current value that flows through the switching element.

18. The power conversion device according to claim 10, wherein upon detecting an overcurrent, the control unit stops generating the gate signal.

19. The power conversion device according to claim 18, wherein the control unit stops generating the gate signal to interrupt a drive voltage to a gate terminal of the switching element.

* * * * *